(12) United States Patent
Schröder et al.

(10) Patent No.: US 7,338,213 B2
(45) Date of Patent: Mar. 4, 2008

(54) BARREL-SHAPED BEARING

(75) Inventors: Rainer Schröder, Egenhausen (DE);
Martin Grehn, Dittelbrunn (DE)

(73) Assignee: FAG Kugelfischer AG (DE)

( * ) Notice: Subject to any disclaimer, the term of this patent is extended or adjusted under 35 U.S.C. 154(b) by 312 days.

(21) Appl. No.: 10/533,195

(22) PCT Filed: Nov. 21, 2003

(86) PCT No.: PCT/DE03/03868

§ 371 (c)(1),
(2), (4) Date: Jun. 9, 2005

(87) PCT Pub. No.: WO2004/051099

PCT Pub. Date: Jun. 17, 2004

(65) Prior Publication Data

US 2006/0165333 A1 Jul. 27, 2006

(30) Foreign Application Priority Data

Nov. 30, 2002 (DE) ................................ 102 55 992

(51) Int. Cl.
*F16C 23/08* (2006.01)
*F16C 33/46* (2006.01)
(52) U.S. Cl. .................. 384/558; 384/568; 384/574
(58) Field of Classification Search ............... 384/558, 384/568, 572, 574, 575, 577, 551, 555
See application file for complete search history.

(56) References Cited

U.S. PATENT DOCUMENTS

| 137,415 | A | * | 4/1873 | Burr | 384/565 |
| 574,988 | A | * | 1/1897 | Ferrall | 384/551 |
| 1,018,324 | A | * | 2/1912 | Kempster | 384/588 |
| 1,454,057 | A | | 5/1923 | Kuttner | |
| 1,806,279 | A | * | 5/1931 | Booth | 384/565 |
| 2,016,526 | A | * | 10/1935 | Tyson | 384/565 |
| 4,010,527 | A | * | 3/1977 | Swanson | 384/577 |
| 6,247,847 | B1 | | 6/2001 | Lob | |

FOREIGN PATENT DOCUMENTS

| DE | 391 950 | 3/1924 |
| DE | 663 179 | 7/1938 |
| EP | 0 684 408 | 11/1995 |

OTHER PUBLICATIONS

International Search Report for PCT /DE03/03868 dated May 6, 2004.

* cited by examiner

*Primary Examiner*—Thomas R. Hannon
(74) *Attorney, Agent, or Firm*—Ostrolenk, Faber, Gerb & Soffen, LLP

(57) ABSTRACT

A barrel-shaped bearing which comprises an external ring and an internal ring, at least one row of barrel-shaped rolling bodies arranged therebetween, the cage in the form of a disk which turns together with the rolling bodies, engages inside a peripheral groove around each rolling body and is provided with recesses corresponding to the number of the rolling bodies of the one row arranged on the external periphery of the cage. The total rolling surface of the internal ring is embodied such that the cross section thereof is concave along the entire axial length of the rolling body. The smallest distance between both sides of the cavity of the disk-shaped cage in the area of the external periphery thereof is less than the diameter of a rolling body in the area of the peripheral groove thereof.

16 Claims, 5 Drawing Sheets

BARREL-SHAPED BEARING

CROSS REFERENCE TO RELATED APPLICATION

The present application is a 35 U.S.C. §§ 371 national phase conversion of PCT/DE2003/003868, filed 21 Nov. 2003, which claims priority of German Application No. 102 55 992.9, filed 30 Nov. 2002. The PCT International Application was published in the German language.

BACKGROUND OF THE INVENTION

The invention concerns a barrel-shaped bearing having an external ring, an internal ring, and at least one row of barrel-shaped rolling bodies arranged between the rings. At least one disk-shaped cage which revolves together with the rolling bodies, engages in an encircling groove of the rolling bodies of one row and, on its outer circumference, has a number of recesses corresponding to the number of rolling bodies of a row thereof.

An arrangement of the generic type can be seen in German patent specification 663 179. This reference shows a spherical roller bearing, with rolling bodies having a stepped cross section and rolling with their distal regions on the external ring and their proximal regions on the internal ring. However, in this arrangement, first, an unfavorable force profile is produced by the rolling bodies being subjected not only to compressive stress but also to bending stress, and secondly, the axial space required by this bearing is comparatively large. However, the fact that, even if there is a small pivoting of the external ring in relation to the remaining bearing components, as is possible for barrel-shaped bearings, one of the two contact surfaces between the rolling bodies and the outer ring can rapidly wear away, which is an even more serious disadvantage. Due to the transverse moments acting on the rolling bodies, this results in instability of the relevant, barrel-shaped rolling body which may prevent their return, which is required during further rotation of the bearing, to the running surface of the external ring and in such a case will lead to the destruction of the bearing. Further, the disk-type cage is unable to provide any sort of stabilization, since it guides the rolling bodies exclusively in their tangential position, but not in the radial direction.

SUMMARY OF THE INVENTION

The disadvantages of the described prior art caused development of the invention of a barrel-shaped bearing of the known general type but such that, even if there is a considerable tilting or swinging of the external ring relative to the remaining parts of the barrel-shaped bearing, the rolling bodies can remain stable and, on further rotation of the bearing, those bodies can always return to the center of the running surface of the external ring.

This problem is solved for a barrel-shaped bearing of the general type by providing the entire running surface of the internal ring with a concave cross section over the entire axial length of a rolling body, and by the shortest distance between the two sides in a recess of the disk-type cage for receiving a rolling body being smaller in the region of the outer circumference of the cage than the diameter of the rolling body in the region of a groove encircling the rolling body.

These two measures complement each other because no transverse or tilting moments act on the rolling bodies because surface regions of the rolling bodies, which regions lie opposite one another in the radial direction, conduct the radial forces to the two bearing rings, so that the rolling bodies remain stable even when the bearing components tilt or swing greatly. In addition, the disk-shaped cage prevents the rolling bodies from becoming detached from the bearing even if the rolling bodies temporarily lose complete contact with the external ring. The bearing according to the invention therefore operates satisfactorily even if the pivoting of the bearing components exceeds customary limit values.

By designing the (greatest) width of the groove encircling the rolling body between the regions of the rolling-body circumferential surface to have the largest cross section making up only approximately one quarter to one tenth of the axial overall length of the rolling body, a high (radial) load-bearing capacity of a rolling body is produced. As a result, a barrel-shaped bearing of this type is very stable in comparison with its axial extent.

It has proven beneficial for the distance between the base of a recess of the disk-type cage to the internal circumference of the cage to be smaller than the depth of the groove in a rolling body. As a result, the desired, purely concave cross-sectional geometry of the running surface of the internal ring is possible.

By the maximum (radial) width of the annular disk-type cage between the inner and outer circumferential circle thereof being greater than half of the diameter of a rolling body in the region of the groove encircling the rolling body, the rolling bodies can be engaged around the mutually diametrically opposite regions of the groove base and can thus be securely held even if the external ring is tilted to a very great extent relative to the remaining bearing components.

The maximum (radial) width of the annular disk-type cage between the inner and outer circumferential circle thereof should preferably be equal to the diameter of a rolling body in the region of the groove encircling the body, or should be greater than that diameter, in order, firstly, to be able to obtain sufficient stability despite the recesses in the external circumference of the cage and, secondly, to be able to securely engage around the individual rolling bodies.

It has proven successful to select the distance between two adjacent recesses of the disk-type cage to be larger in the external circumference thereof than the difference of the maximum diameter of a rolling body minus the diameter thereof in the region of the groove base, for example by 5 to 30%, so that adjacent rolling bodies cannot come into contact with one another.

If—as the invention furthermore provides—the sides of a recess in the region of the external circumference of the disk-type cage converge in the radial direction thereof (as seen to the outside), then the functions of the smooth-running rotatability of the rolling bodies, on the one hand, and the secure mounting thereof, on the other hand, are combined with one another in an advantageous manner.

Further advantages arise from the fact that a recess in the disk-type cage is defined by a curve of constant curvature (in some regions). The radius of curvature $r_S$ of this curve should be somewhat larger than half of the diameter of a rolling body in the region of the groove base of the rolling body, so that a (small) play is ensured so that the relevant rolling body can rotate in a smooth-running manner.

One effect of the form-fitting connection, which is required further above, between the disk-type cage and rolling bodies is shown in the fact that the radius of curvature r (which is constant in some regions) of the edging curve of a recess of the disk-type cage should be smaller than the radial width b of the disk-type cage: r<b, because in such a case the ends of the edge curve are able to approach one another in the region of the external circumference of the disk-type cage.

A further advantageous feature of the invention comprises the encircling groove in the circumferential surface of a barrel-shaped rolling body having side surfaces which are mutually parallel or which diverge outward from each other. In order to ensure that the rolling bodies rotate relative to the disk-type cage in a manner which is as free from friction as possible, the width of the groove in the circumferential surface of a barrel-shaped rolling body should be somewhat greater than the (axial) width d of the disk-type cage. On the other hand, in particular load situations, individual rolling bodies can be forced into a tilting movement in relation to the disk-type cage, and a movement of this type may, if appropriate, be facilitated by a groove shape having outwardly diverging side surfaces.

This feature of the invention can be developed to the effect that the side surfaces of the encircling groove in the circumferential surface of a barrel-shaped rolling body run along conical circumferential surface areas. This is a simple geometrical shape which meets all of the requirements which have been set.

If, in this connection, the conical circumferential surface areas in each case have opening angles $\alpha$ of less than 179°, then the side surfaces of a groove enclose an intermediate angle $\beta=180°-\alpha$ of more than 2°. To a resultant rolling-body tilting angle is added a tilting angle caused by the play between these elements, so that the maximum tilting angle of the rolling-body axes of rotation in relation to the perpendicular to the area of the disk-type cage can be, for example, in the order of magnitude of 5° to 10°. This play-induced tilting angle is influenced by the groove width $b_N$ on the groove base. For reasons concerned with minimizing the friction, this value should correspond at least to the (axial) thickness d of the disk-type cage; the difference between the groove width $b_N$ at the groove base and the (axial) thickness d of the disk-type cage can preferably be set approximately to the opening angle $\alpha$ of the groove side surfaces, which are in the shape of a conical circumferential surface area, in accordance with the following relationship:

$$b_N - d \approx 2 * r_S * \tan(\beta/x2) = 2 * r_S * \tan(90° - /2)$$

In such a case, those regions of the groove side surfaces of a rolling body which extend approximately in the tilting direction are situated, in the maximum tilting position of said rolling body, approximately parallel to the disk-type cage, and guide forces which may have to be transmitted can be introduced over a large surface area and therefore at low pressure.

On the other hand, the opening angle $\alpha$ of such conical circumferential surface areas should be more than 170°, preferably more than 175°, in particular more than 178°, so that the side surfaces of a groove enclose an intermediate angle $\beta=180°-\alpha$ of less than 20°, preferably of less than 10°, in particular of less than 4°. This results in an additional guidance (with the effect of limiting the tilting angle) by the running surface of the external ring (for example as a consequence of the latter being greatly pivoted) of raised rolling bodies, which guidance requires a picking up of contact between these elements in as problem-free a manner as possible (for example with the pivoting angle being reduced).

Finally, corresponding to the teaching of the invention, the cross section of the internal ring and external ring and of the rolling bodies is dimensioned in such a manner that a total of 3 or 4 contact points are produced per rolling body. This feature relates, in particular, to the transverse radius of convexity of the cross-sectionally concave running surfaces of the internal ring and external ring. This radius of convexity should be somewhat larger than the radius of convexity of the barrel-shaped rolling body within a longitudinal sectional plane through the relevant rolling body. Since, however, the groove of the barrel, which is intended for receiving the disk-type cage, runs in the region of the "equator" of said barrel, the resulting two contact points can split into three or four contact points. This effect is desirable because the load-bearing force of a rolling body is increased as a result, and can be further reinforced by the fact that the central points of the transverse radii of convexity of the two barrel "hemispheres" are spaced apart from each other on both sides of the (equatorial) groove for the disk-type cage in the direction of the axis of rotation or symmetry of the relevant, barrel-shaped rolling body, but preferably only by a small extent x, which, for example, is smaller than the groove width $b_N$ at the groove base: $x<b_N$.

BRIEF DESCRIPTION OF THE DRAWINGS

Further features, details, advantages and effects on the basis of the invention emerge from the description below of preferred embodiments of the invention and with reference to the drawing, in which:

FIG. 3 shows an illustration corresponding to FIG. 2 with the radii of convexity plotted in;

DESCRIPTION OF PREFERRED EMBODIMENTS

Figure 1:
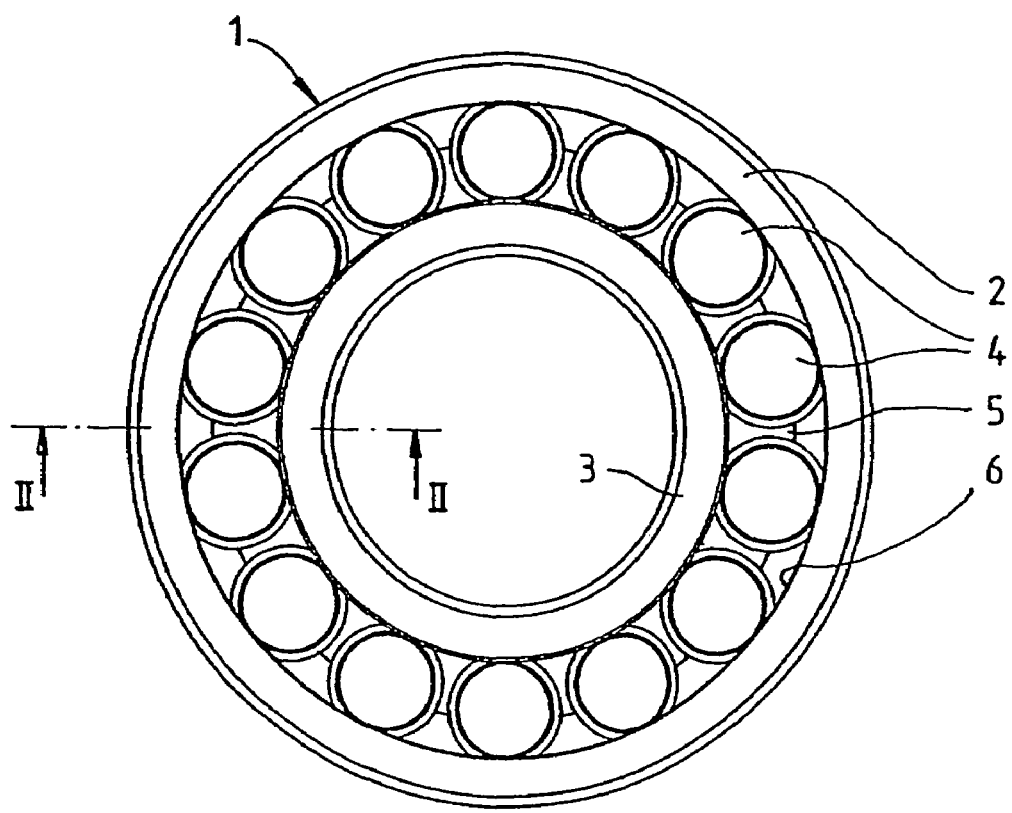
FIG. 1 shows an end view of a barrel-shaped bearing according to the invention.

FIG. 1 shows a barrel-shaped bearing 1 according to the invention having an external ring 2, an internal ring 3 and a row of barrel-shaped rolling bodies 4 which are arranged in between the rings and are held at approximately equidistant distances by an encircling cage 5.

Since the preferred barrel-shaped bearing is of single-row construction, the external ring 2 can be tilted relative to the remaining bearing components 3 to 5. This is made possible by the fact that the rolling-bearing running surface 6 on the external ring 2 has a concave cross section with a constant transverse radius of convexity.

Figure 2:
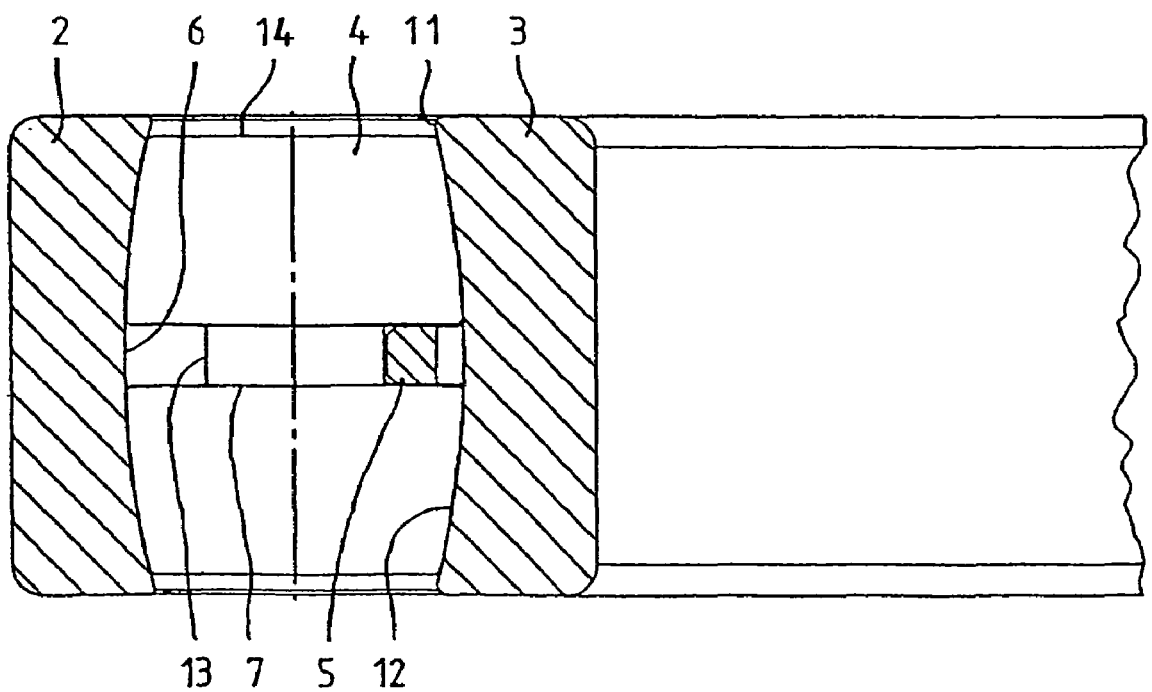
FIG. 2 shows a section through FIG. 1 along the line II-II.
Figure 3:
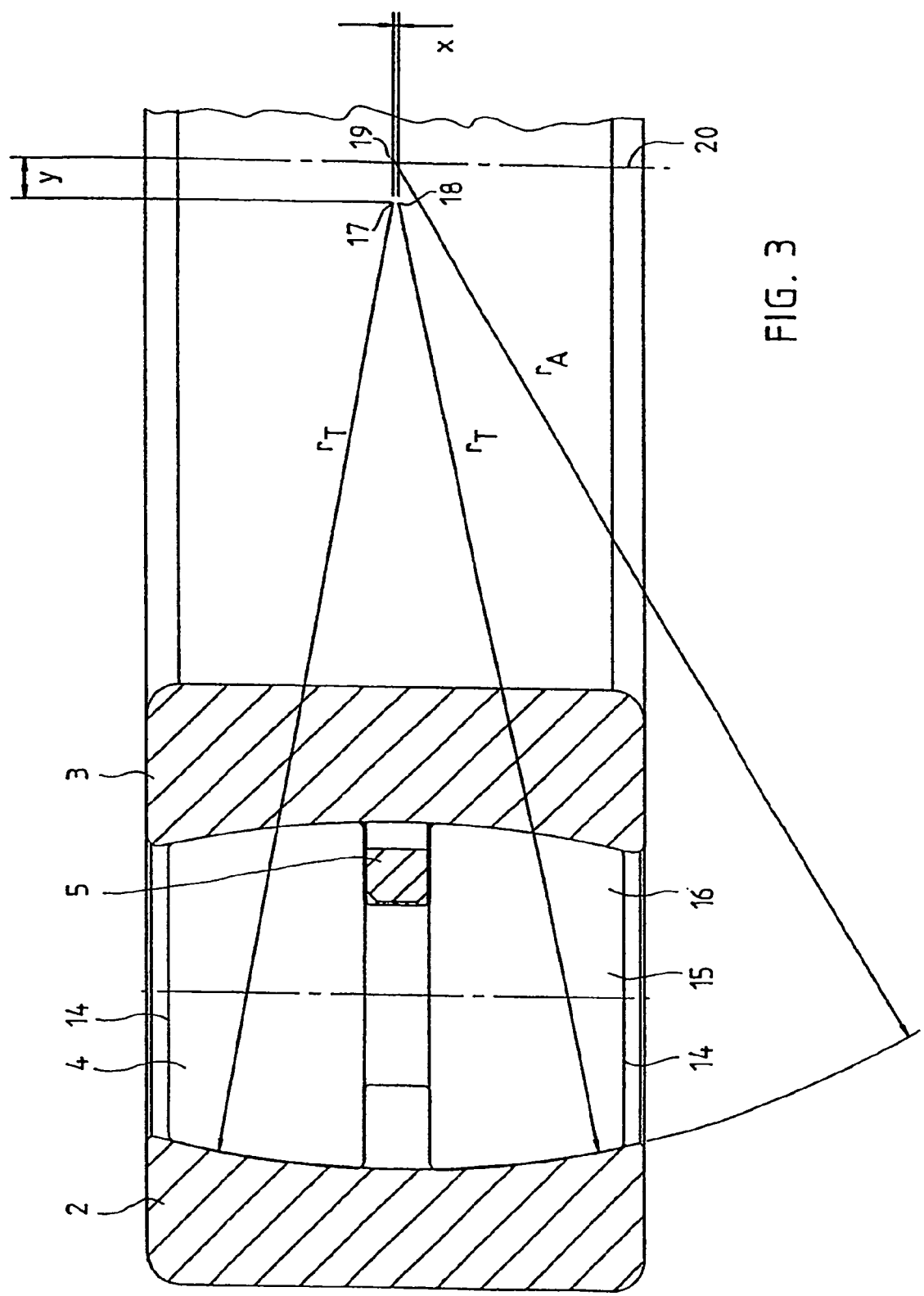

During the tilting of the external ring 2 relative to the remaining bearing components 3 to 5, the cage 5 keeps the rolling bodies 4 in their position. So that it does not, on the other hand, obstruct either the tilting movement of the external ring 2 or the movement of the rolling bodies 4, it extends through an encircling groove 7 of each rolling body 4, as illustrated in FIGS. 2 and 3.

Figure 8:
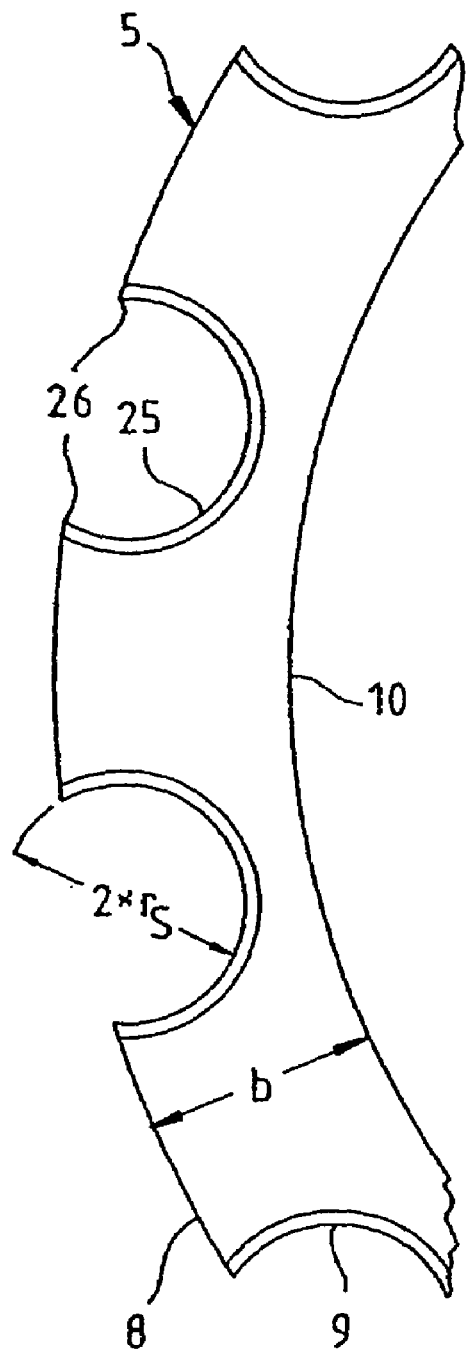
FIG. 8 shows a plan view of a segment broken out of the cage from FIGS. 4 and 5.

The cage 5 can be produced from a disk with a constant thickness d, for example can be punched out of a metal sheet. As FIG. 8 shows, a number of recesses 9 corresponding to the number of rolling bodies 4 are cut out from the radially outer circumference 8 of an annular basic structure with a constant, radial width. Each recess accommodates one rolling body 4.

The internal circumference 10 of the disk-shaped cage 5 preferably corresponds to the maximum external circumference of the internal ring 3, in particular at an edge 11 of the running surface 12 of the ring, so that the cage 5 can easily be pulled over the internal ring 3, for example mechanically. The insertion of the rolling bodies 4 into the recesses 9 of the disk-shaped cage 5 can likewise be brought about automatically, and the inserted rolling bodies 4 then are held in situ because they are engaged around in the region of the relevant groove base 13 by the cage 5. After the external ring 2 has been pulled over into a position tilted, for example, by 90° and has been pivoted into the plane of the internal ring 3, the assembly of the barrel-shaped bearing 1 is finished.

The barrel-shaped rolling bodies 4 are therefore divided approximately centrally between their two end sides 14 in their "equatorial" plane into two halves 15, as it were into "hemispheres" by the encircling groove 7. In the case of the rolling bodies 4 according to the invention, the two contact regions of a bearing with undivided (not grooved) rolling bodies are therefore divided into four contact regions. This affords the advantage that the radial loads which are to be transmitted are distributed over a relatively large overall area.

This effect is therefore additionally assisted by the two "hemispheres" 15 of a rolling body 4 being split into different cross-sectional geometries. To be precise, one cross section through the circumferential surface area 16 of a rolling body has in both hemispheres 15 thereof a respective profile in the form of an arc of a circle with preferably identical radii of curvature $r_T$. However, the central points 17, 18 of the cross-sectional curvature of the two hemispheres do not coincide, but rather are slightly offset from each other in the axial direction of the barrel-shaped bearing 1, to be precise toward the relevant rolling-body hemisphere 15 or end side 14. A value of the order of magnitude of 0.001 to 0.02, in particular of between 0.002 and 0.01, has proven successful as the "offset factor" $k_V = x/r_T$.

Since, in addition, the radii of curvature $r_A$, $r_I$ of the running surfaces 6, 12 of the external ring and internal ring 2, 3 are selected to be somewhat larger than the radii of curvature $r_T$ of the two rolling-body hemispheres 15, in the ideal state two mutually diametrically opposite contact regions of the external ring 2, on the one hand, and the internal ring 3, on the other hand, are produced on each hemisphere 15. As a measure of the deviations of the radii of curvature $r_A$, $r_I$, $r_T$, the "osculating factors" $k_A$, $k_I$ can be specified. The latter are defined as $$k_A = (r_A - r_T)/r_T = y/r_T$$

$$k_I = (r_I - r_T)/r_T.$$

These osculating factors $k_A$, $k_I$ are preferably to be in the order of magnitude of 0.01 to 0.1, in particular of between 0.02 and 0.05.

Since the central point 19 of cross-sectional curvature of the running surface 6 of the external ring 2 lies on the axis of rotation or symmetry 20 thereof, to be precise on the central base plane thereof, the central points 17, 18 of cross-sectional curvature of the circumferential surface areas 16 of the two rolling-body hemispheres 15 are in each case offset radially outward by y from the axis of rotation 20 and are offset in relation to the central base plane toward the relevant end side 14 by x/2.

Figure 4:
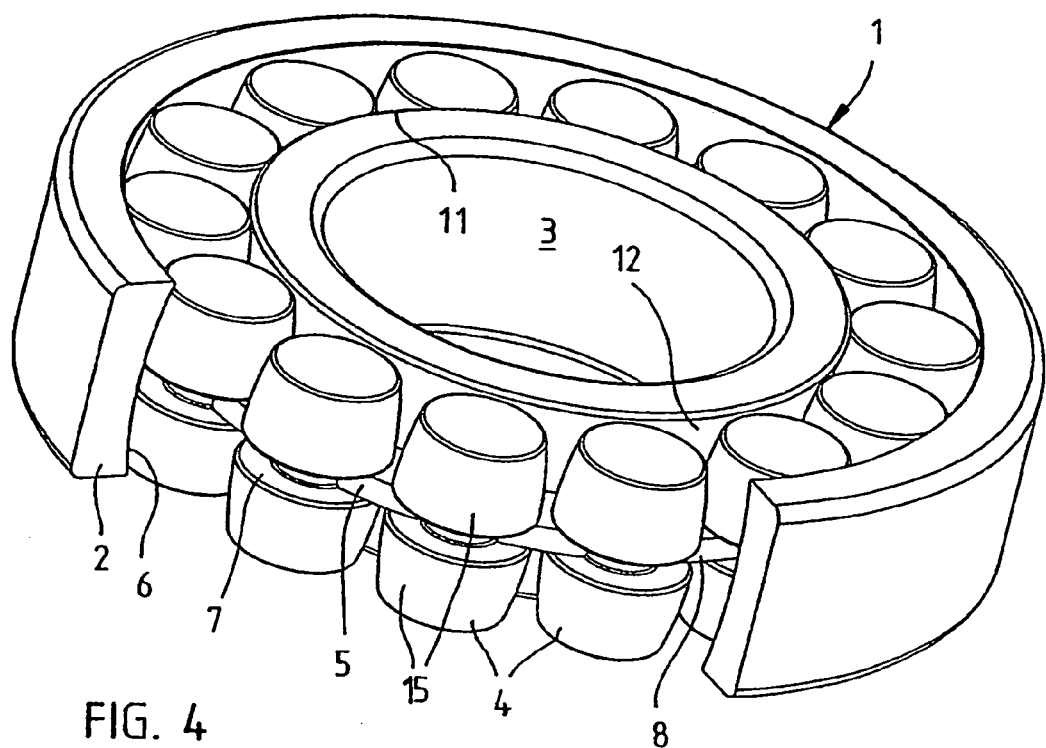
FIG. 4 shows a perspective view of the barrel-shaped bearing from FIG. 1, with the external ring having been partially broken up, so that the view of the rolling bodies held by the cage is opened up.
Figure 5:
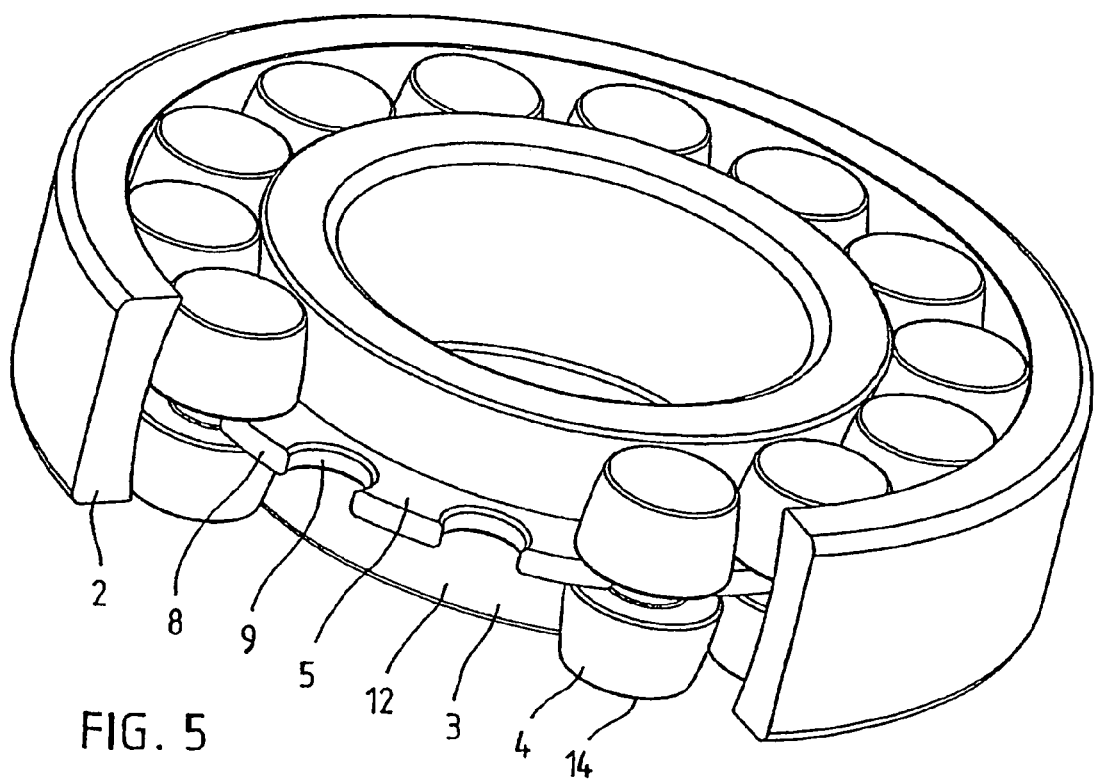
FIG. 5 shows an illustration corresponding to FIG. 4, with some of the rolling bearings having been removed from the exposed cage.

It can be seen in FIG. 4 that even if the external ring 2 is broken away, the rolling bodies 4 are held in situ by the cage 5. This is achieved by the form-fitting connection of the recesses 9 of the cage 5 with the groove regions 7 of the rolling bodies 4.

Figure 6:
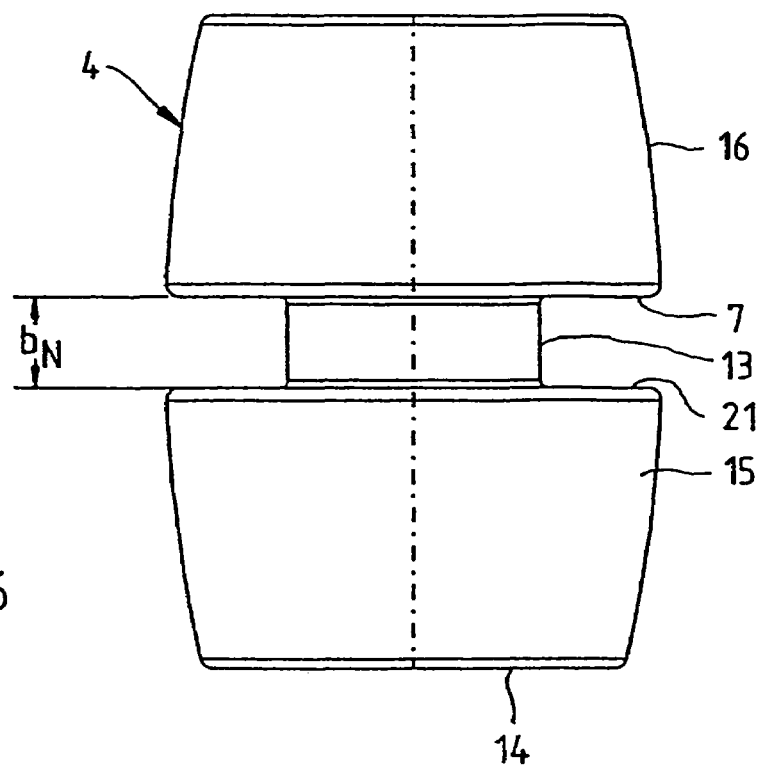
FIG. 6 shows a side view of the circumferential surface of a rolling body removed, according to FIG. 5, from the cage.
Figure 7:
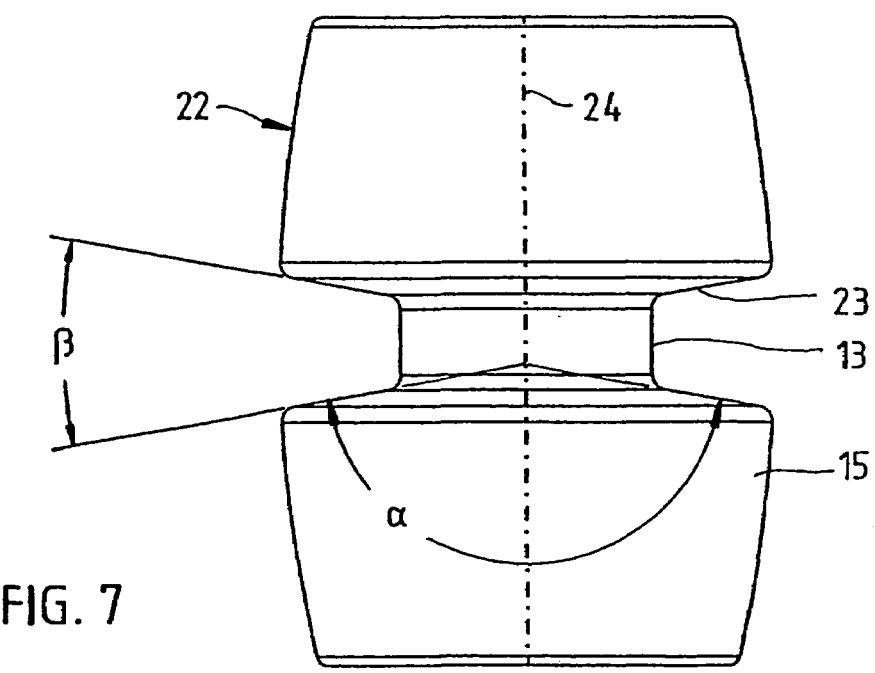
FIG. 7 shows an illustration corresponding to FIG. 6 of a modified embodiment of the invention.

Two possible groove shapes are illustrated in FIGS. 6 and 7. In the embodiment according to FIG. 6, the groove 7 has planar side surfaces 21, that are produced, for example, by a straight plunge cut. Accordingly, the width $b_N$ of the groove 7 is approximately constant. The groove base 13 follows a cylindrical circumferential surface area with the radius of curvature $r_N$. The transition regions between the groove base 13 and groove side surfaces 21, between the latter and the circumferential surface areas 16 and between the circumferential surface areas 16 and end surfaces 14 are rounded in order to avoid burrs and stress concentrations.

The embodiment of a rolling body 22 according to FIG. 7 differs from that according to FIG. 6 exclusively by virtue of the fact that the groove side surfaces 23 run along conical circumferential surface areas. This involves very blunted cones having preferably identical opening angles α of virtually 180° in each case (for example 170° to 179°). Accordingly, the groove side surfaces 23 diverge from each other at an angle β, as viewed along a radial plane to the outside from the axis of symmetry 24. In this case: β=(180°−α) in the case of identical opening angles α of both groove side surfaces 23, and in the case of different opening angles $α_1$, $α_2$: β=(180°−($α_1$+$α_2$)/2). The (axial) width of the groove base is in turn $b_N$ and its radius of curvature is $r_N$. With the same values for $b_N$ and d, this embodiment tolerates relatively large offset angles of the barrel-shaped rolling bodies 22 and therefore results in a smaller amount of wear when subjected to corresponding stresses.

A cutout from the cage 5 is reproduced in FIG. 8. Recesses 9 which are in the form of an arc of a circle and have a constant radius of curvature $r_S$ can be seen. By means of $r_S > r_N$ and $d < b_N$, a rotational movement of the rolling bodies 4, which is as free as possible from friction, in relation to the cage 5 is ensured. In order to be able to secure the rolling bodies, the circumference 25 of a recess 9 extends over an arc of a circle of more than 180°, for example of between 200° and 230°, in particular of 210° to 220°, so that the end regions 26 of the recess circumference 25 converge, in the viewing direction from the internal circumference 10 of the cage 5 towards its external circumference 8. The minimum distance of the end regions 26 is smaller than the diameter ($2*r_N$) of the rolling bodies 4 in the region of the groove base 13, so that the rolling bodies 4 are engaged around in a form-fitting manner. In order to release a rolling body 4 from the cage 5, the former has therefore to be pulled outward with a large force in order (temporarily) to push the end regions 26 of the recess circumference 25 apart. The end regions 26 therefore form snap-in lugs for snapping in the rolling bodies 4.

Figure 9:
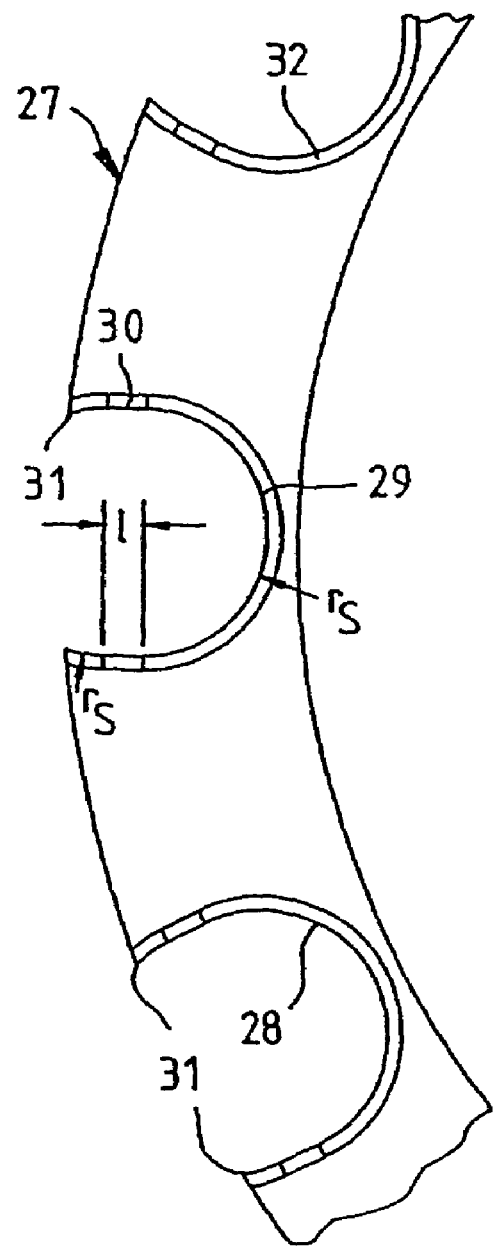
FIG. 9 shows an illustration corresponding to FIG. 8 of an embodiment of the invention which has in turn been modified.

The modified disk-type cage 27 from FIG. 9 has a similar effect. This cage differs from the cage 5 according to FIG. 8 exclusively by the recess circumference 28, which has the radius of curvature $r_S$ in its region 29 facing the inside 10 of the cage 27, having, approximately level with its radial profile, flattened (approximately mutually parallel) regions 30 (having a length l, of for example $r_S/3$) which are then adjoined by the actual snap-in lugs 31, which are in turn curved and converge towards each other and the radius of curvature of which can be selected to coincide with $r_S$. This embodiment tolerates relatively large radial offsets of the cage 27 with respect to the rolling bodies 4, which offsets may occur, for example, as a consequence of sharp temperature fluctuations, but without the rolling bodies 4 being able to be released if the external ring 2 tilts sharply. As in the case of the cage 5, the edges of the recess circumference 32 are also cross-sectionally rounded here.

The invention claimed is:

1. A barrel-shaped bearing comprising:
an external bearing ring, and an internal bearing ring inward of the external ring;
at least one row of barrel-shaped rolling bodies arranged between the external and internal rings, each rolling body of the at least one row of barrel-shaped rolling bodies having opposite ends and an encircling groove in and extending around the rolling body between the ends thereof;
at least one disk-shaped cage between the rings positioned and configured to revolve together with the rolling bodies, the cage engaging the encircling grooves of the rolling bodies of one row, the cage having an outer circumference, including a plurality of recesses therein corresponding to the number of rolling bodies in the row, the inner ring having a running surface toward the rolling bodies, and the entire running surface of the internal ring having a concave cross section extending axially over the entire axial length of the rolling bodies;
each recess of the plurality of recesses in the cage being of such depth and so shaped as to have two opposed sides such that the smallest distance between the two opposed sides of a recess of the disk-type cage is smaller in the region of the outer circumference of the cage than a diameter of a rolling body in the region of the groove encircling the rolling body,
wherein the two opposed sides of each recess of the disk-type cage in the region of the outer circumference of the cage converge in the radial direction.

2. The barrel-shaped bearing as claimed in claim 1, wherein the maximum radial width b of the annular disk-type cage between the outer circumference and an inner circumferential surface of the cage is greater than half the diameter of the rolling body in the region of the groove encircling the rolling body.

3. The barrel-shaped bearing as claimed in claim 1, wherein the maximum radial width b of the annular disk-type cage between the outer circumference and an inner circumferential surface of the cage is equal to or greater than the diameter of the rolling body in the region of the groove encircling the rolling body.

4. The barrel-shaped bearing as claimed in claim 1, wherein the distance between two adjacent recesses in the disk-type cage in the region of the outer circumference thereof is greater than a difference in the maximum diameter of the rolling body minus the diameter of the rolling body in the region of the groove base.

5. The barrel-shaped bearing as claimed claim 1, wherein the recess in the disk-type cage is edged by a curve of constant curvature $r_S$ at least in some regions.

6. The barrel-shaped bearing as claimed in claim 5, wherein the radius of curvature $r_S$ of an edging curve of the recess of the disk-type cage is smaller than a radial width b of the disk-type cage: such that $r_S < b$.

7. The barrel-shaped bearing as claimed in claim 1, wherein the encircling groove in the circumferential surface of the barrel-shaped rolling body has mutually parallel side surfaces or has side surfaces that diverge outward from each other.

8. The barrel-shaped bearing as claimed in claim 7, wherein the side surfaces of the encircling groove in the circumferential surface of the barrel-shaped rolling body run along conical circumferential surface areas.

9. The barrel-shaped bearing as claimed in claim 8, wherein the conical circumferential surface areas have opening angles α of less than 179°, so that the side surfaces of the groove enclose an intermediate angle β of more than 2°.

10. The barrel-shaped bearing as claimed in claim 8, wherein the conical circumferential surface areas of a groove have opening angles α of more than 170°, so that the side surfaces of the groove enclose an intermediate angle β of less than 20°.

11. The barrel-shaped bearing as claimed in claim 10, wherein the opening angle is more than 175° and the intermediate angle is less than 10°.

12. The barrel-shaped bearing of claim 10, wherein the opening angle is more than 178° and the intermediate angle is less than 4°.

13. The barrel-shaped bearing as claimed in claim 1, wherein the groove has width $b_N$ at the groove base which corresponds approximately to the thickness d of the disk-type cage.

14. The barrel-shaped bearing as claimed in claim 1, wherein the external ring, the internal ring and the rolling bodies have respective cross-sections dimensioned such that a total of three or four contact points with the rings are produced per rolling body.

15. A barrel-shaped bearing comprising:
an external bearing ring, and an internal bearing ring inward of the external ring;
at least one row of barrel-shaped rolling bodies arranged between the external and internal rings, each rolling body of the at least one row of barrel-shaped rolling bodies having opposite ends and an encircling groove in and extending around the rolling body between the ends thereof;
at least one disk-shaped cage between the rings positioned and configured to revolve together with the rolling bodies, the cage engaging the encircling grooves of the rolling bodies of the at least one row, the cage having an outer circumference including a plurality of recesses, each recess of the plurality of recesses corresponding to each rolling body, the inner ring having a running surface toward the rolling bodies, and the entire running surface of the internal ring having a concave cross section extending axially over the entire axial length of the rolling bodies;
each recess of the plurality of recesses in the cage being of such depth and so configured as to have two opposed sides such that a smallest distance between the two opposed sides of each recess is smaller in the region of the outer circumference of the cage than a diameter of a rolling body in the region of the groove encircling the rolling body,
wherein the recess in the disk-type cage is edged by a curve of constant curvature $r_S$ in at least some regions.

16. A barrel-shaped bearing comprising:
an external bearing ring, and an internal bearing ring inward of the external ring;
at least one row of barrel-shaped rolling bodies arranged between the external and internal rings, each rolling body of the at least one row of barrel-shaped rolling bodies having opposite ends and an encircling groove in and extending around the rolling body between the ends thereof;

at least one disk-shaped cage between the rings positioned and configured to revolve together with the rolling bodies, the cage engaging the encircling grooves of the rolling bodies of one row, the cage having an outer circumference including a plurality of recesses therein, each recess of the plurality of recesses corresponding to each rolling body, the inner ring having a running surface toward the rolling bodies, and the entire running surface of the internal ring having a concave cross section extending axially over the entire axial length of the rolling bodies;

each recess of the plurality of recesses in the cage being of such depth and so shaped as to have two opposed sides such that a smallest distance between the two opposed sides of a recess of the disk-type cage is smaller in the region of the outer circumference of the cage than a diameter of a rolling body in the region of the groove encircling the rolling body, wherein the opposed side surfaces of the encircling groove in the circumferential surface of the barrel-shaped rolling body run along conical circumferential surface areas.

* * * * *